(12) United States Patent
Morton et al.

(10) Patent No.: US 12,181,360 B1
(45) Date of Patent: Dec. 31, 2024

(54) SYSTEMS AND METHODS TO ESTABLISH MAXIMUM TIME INTERVAL BETWEEN CALIBRATIONS OF PROCESS SENSORS

(71) Applicant: Analysis and Measurement Services Corporation, Knoxville, TN (US)

(72) Inventors: Gregory W. Morton, Knoxville, TN (US); Brent D. Shumaker, Knoxville, TN (US); Hashem M. Hashemian, Knoxville, TN (US)

(73) Assignee: Analysis and Measurement Services Corp., Knoxville, TN (US)

( * ) Notice: Subject to any disclaimer, the term of this patent is extended or adjusted under 35 U.S.C. 154(b) by 331 days.

(21) Appl. No.: 17/746,550

(22) Filed: May 17, 2022

(51) Int. Cl.
| | |
|---|---|
| *G01L 27/00* | (2006.01) |
| *G01F 25/10* | (2022.01) |
| *G21C 17/10* | (2006.01) |
| *H04B 17/11* | (2015.01) |
| *H04B 17/21* | (2015.01) |

(52) U.S. Cl.
CPC ............ *G01L 27/005* (2013.01); *G01F 25/10* (2022.01); *G21C 17/10* (2013.01); *H04B 17/11* (2015.01); *H04B 17/21* (2015.01)

(58) Field of Classification Search
CPC ....... H04B 17/11; H04B 17/21; G01L 27/005; G01F 25/10; G21C 17/10
USPC ........................................................ 375/371
See application file for complete search history.

(56) References Cited

U.S. PATENT DOCUMENTS

2012/0213266 A1* 8/2012 Su .......................... H04B 17/21
375/226

\* cited by examiner

*Primary Examiner* — Leila Malek
(74) *Attorney, Agent, or Firm* — Pitts Lake, LLC

(57) ABSTRACT

Systems and methods of monitoring transmitters of an industrial facility, including a computing unit configured to receive calibration data of a plurality of transmitters, the computing unit being configured to calculate a maximum interval value between transmitter calibration and to communicate the maximum interval value to OLM system to generate a report containing calibration information related to the various transmitters.

15 Claims, 9 Drawing Sheets

SYSTEMS AND METHODS TO ESTABLISH MAXIMUM TIME INTERVAL BETWEEN CALIBRATIONS OF PROCESS SENSORS

BACKGROUND OF THE INVENTION

1. Field of Invention

The present invention pertains generally to online monitoring (OLM) systems for industrial plants and, more particularly, to an OLM system for verifying the static and dynamic performance of sensors in-situ, characterizing vital process parameters, identifying critical process anomalies, and trending the health of critical components within a nuclear facility and other industrial facilities.

2. Description of the Related Art

The word "transmitter" is used herein to refer to transmitters and sensors (including, but not limited to, both pressure sensors, differential pressure sensors, flow sensors, and level sensors) that are used in, for example, nuclear facilities to measure values such as process pressure, level, and flow.

Conventional calibrations of transmitters in a nuclear facility typically involve two steps. In the first step, in order to determine whether a pressure transmitter must be calibrated, the transmitter is manually isolated from the plant processes and operations, and a range of known pressures are applied to the transmitter covering the operating range of the transmitter while measuring its output. The data from this step is referred to as the "as-found" calibration data. If the "as-found" data shows that the calibration of a transmitter is acceptable, then no further action is needed, and the transmitter is returned to service. Otherwise, the transmitter is calibrated as detailed in the second step. In the second step, manual adjustments are made to transmitter zero and/or span settings via on-board potentiometers to make the transmitter read a range of applied pressures as closely as possible. The data from this step is referred to as "as-left" calibration data.

Example embodiments of the present general inventive concept provide systems, processes, and methods designed to reduce unnecessary calibrations and reduce overall operating costs for the industrial facility.

SUMMARY OF THE INVENTION

Example embodiments of the present general inventive concept can be achieved by a system of monitoring transmitters of an industrial facility, including a calculation unit configured to calculate a maximum calibration interval value by generating a probability of same-direction drift for all redundant transmitters, inputting a total number of calibration adjustments made, or required to be made, to each redundant transmitter over a period of time, inputting a total number of calibration checks made to each redundant transmitter over the period of time, generating a probability of calibration adjustment for each redundant transmitter by dividing the total number of calibration adjustments by the total number of calibration checks, respectively, generating a probability that all redundant transmitters will require adjustment at the same time, based on the probabilities of calibration adjustment calculated for each redundant transmitter, generating a probability of common mode drift by multiplying the calculated probability that all redundant transmitters in the group of redundant transmitters will require adjustment at the same time by the calculated probability of same direction drift for all redundant transmitters, inputting a maximum probability of common-mode drift for the group of redundant transmitters, calculating an average time interval between calibrations for each redundant transmitter, calculating an average calibration interval by averaging the calculated average time interval between calibrations for each redundant transmitter, calculating a maximum interval based on the calculated probability of common mode drift, the calculated average calibration interval, and the maximum probability of common-mode drift for the group of redundant transmitters, and calculating a maximum calibration interval value from the calculated maximum interval, wherein the maximum calibration interval value is processed to be greater than or equal to the average calibration interval and is less than or equal to a maximum time span of calibration data.

Additional features and embodiments of the present general inventive concept will be set forth in part in the description which follows and, in part, will be understood from the description and figures, or may be learned by practice of the present general inventive concept.

FIGURES

The above-mentioned and additional features of the invention will become more clearly understood from the following detailed description of the invention read together with the drawings in which.

DETAILED DESCRIPTION

Figure 1:
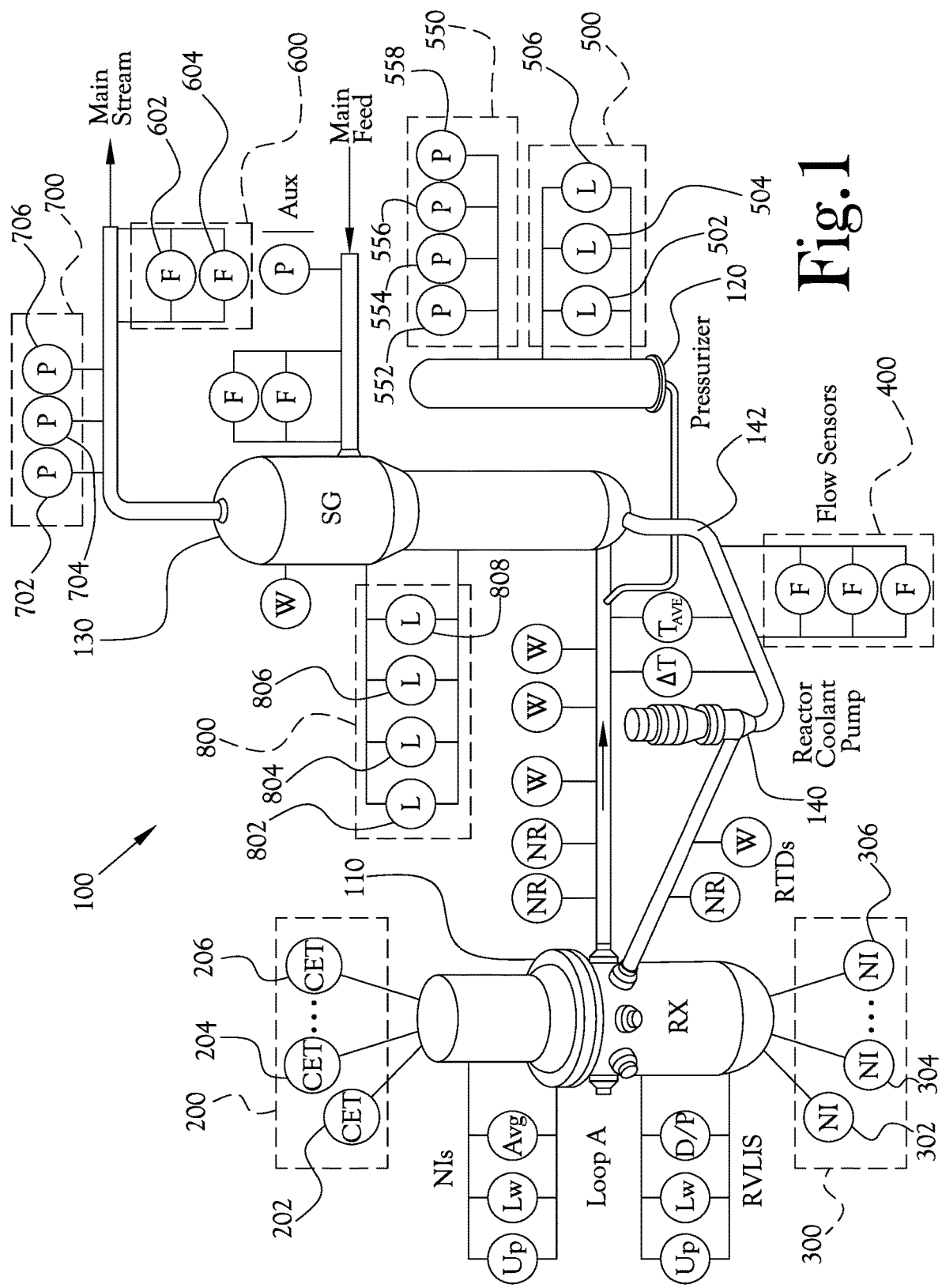
FIG. 1 is a schematic diagram view of a number of systems within a nuclear power plant, showing a number of groups of redundant transmitters.

On line monitoring (OLM) technology for transmitter drift monitoring is known to involve procedures that are passive and benign to plant operation. OLM typically requires a means to retrieve the output readings of transmitters, which can be accomplished using the plant computer or a separate data acquisition system, and a control system package to validate and analyze the transmitter data. OLM is not a substitute for conventional calibrations. Rather, it is an analytical tool analogous to using measuring and test equipment (M&TE) to check for drift of transmitters during plant operation in order to determine if they must be scheduled for a physical calibration by plant personnel during an upcoming plant outage.

As a defense against common-mode drift, one transmitter from each group of redundant transmitters involved in OLM must be checked for calibration at a given interval. This interval is called a "backstop" herein. A backstop that is established based on the process herein will not be the same for all groups of redundant transmitters or all plants. It varies based on transmitter redundancy, service in the plant, and each plant's experience with calibration behavior of its transmitters. The backstop is a dynamic number meaning that it can change (increase or decrease) as more history on calibration behavior of transmitters is accumulated and analyzed by each plant.

OLM technology can be used in industrial facilities such as nuclear facilities as an analytical tool to measure sensor drift during operation and thereby identify the sensors whose calibration must be checked physically during an outage. The technology involves a procedure to retrieve redundant sensor measurements from the process computer or through a separate data acquisition system; calculate the average of these measurements and the deviation of each sensor from the average; and identify any sensor or sensors that have deviated beyond a predetermined monitoring limit.

OLM data is normally available in the plant computer or an associated data historian. If data is not available from the plant computer or historian, a custom data acquisition system including hardware and software can be employed to acquire the OLM data during startup, normal operation, and shutdown periods at the highest sampling rate by which the plant computer takes data.

A maximum calibration interval value, sometimes referred to herein as a backstop value, can be established for each group of redundant transmitters amenable to OLM as a defense against common mode drift. The backstop identifies the maximum period of time that should elapse between sensor calibrations.

In some example embodiments of the present general inventive concept, a system for monitoring transmitter drift within a group of redundant transmitters in a power plant comprises a computing unit configured to receive calibration data of the redundant transmitters, including an executable software routine configured to calculate a backstop value indicating an interval of time after which at least one redundant transmitter in the group of redundant transmitters should be checked for calibration, wherein said backstop value is derived by: calculating probability that drift is occurring in a same direction for all redundant transmitters in the group of redundant transmitters, based on the number of redundant transmitters in the group of redundant transmitters; for each redundant transmitter, calculating a total number of calibration adjustments made to or required for said redundant transmitter over the course of its service life to date; for each redundant transmitter, calculating a total number of calibration checks made of said redundant transmitter over the course of its service life to date; for each redundant transmitter, calculating a probability of calibration adjustment by dividing the total number of calibration adjustments by the total number of calibration checks; calculating a probability that all redundant transmitters in the group of redundant transmitters will require adjustment at the same time, based on the probabilities of calibration adjustment calculated for each redundant transmitter; calculating a probability of common mode drift by multiplying the calculated probability that all redundant transmitters in the group of redundant transmitters will require adjustment at the same time by the calculated probability that drift is occurring in a same direction for all redundant transmitters in the group of redundant transmitters; selecting a maximum probability of common-mode drift for the group of redundant transmitters; calculating an average time interval between calibrations for each redundant transmitter; calculating an average calibration interval by averaging the calculated average time interval between calibrations for each redundant transmitter; calculating a maximum interval based on the calculated probability of common mode drift, the calculated average calibration interval, and the maximum probability of common-mode drift for the group of redundant transmitters; calculating a backstop value from said calculated maximum interval, wherein said backstop value is greater than or equal to the average calibration interval, and wherein said backstop value is less than or equal to a maximum time span of plant calibration data. The computing unit can include a report generator configured to interface with an online monitoring system (OLM) to output one or more backstop values, including generating a report containing calibration information identifying transmitters calibrated according to the backstop value, transmitters calibrated due to output reading that deviate from predetermined tolerances, and transmitters calibrated based on other factors, such as time of service.

In some example embodiments of the present general inventive concept, a method for deriving a backstop value indicating an interval of time after which a calibration check should be made on at least one redundant transmitter in a group of redundant transmitters, including calculating probability that drift is occurring in a same direction for all redundant transmitters in a group of redundant transmitters based on the number of redundant transmitters in the group of redundant transmitters; for each redundant transmitter, calculating a calibration adjustment value for said redundant transmitter over the course of its service life to date; for each redundant transmitter, calculating a total number of calibration checks made of said redundant transmitter over the course of its service life to date; for each redundant transmitter, calculating a probability of calibration adjustment by dividing the total number of calibration adjustments by the total number of calibration checks; calculating a probability that all redundant transmitters in the group of redundant transmitters will require adjustment at the same time, based on the probabilities of calibration adjustment calculated for each redundant transmitter; calculating a probability of common mode drift by multiplying the calculated probability that all redundant transmitters in the group of redundant transmitters will require adjustment at the same time by the calculated probability that drift is occurring in a same direction for all redundant transmitters in the group of redundant transmitters; selecting a maximum probability of common-mode drift for the group of redundant transmitters; calculating an average time interval between calibrations for each redundant transmitter; calculating an average calibration interval by averaging the calculated average time interval between calibrations for each redundant transmitter; calculating a maximum interval based on the calculated probability of common mode drift, the calculated average calibration interval, and the maximum probability of common-mode drift for the group of redundant transmitters; calculating a backstop value from said calculated maximum interval, wherein said backstop value is greater than or equal to the average calibration interval, and wherein said backstop value is less than or equal to a maximum time span of plant calibration data.

In some example embodiments of the present general inventive concept, a method for monitoring transmitter drift within a group of redundant transmitters in a power plant in a power plant comprises: retrieving redundant output readings from said redundant transmitters; calculating an average of the retrieved output readings; calculating a deviation value for each redundant transmitter based on a differential between the output reading for that redundant transmitter and the calculated average of the retrieved output readings; identifying any transmitter with a deviation value in excess of a pre-determined magnitude; and deriving a backstop value indicating an interval of time after which a calibration check should be made on at least one redundant transmitter in the group of redundant transmitters, by: calculating probability that drift is occurring in a same direction for all redundant transmitters in the group of redundant transmitters, based on the number of redundant transmitters in the group of redundant transmitters; for each redundant transmitter, calculating a total number of calibration adjustments made to said redundant transmitter over the course of its service life to date; for each redundant transmitter, calculating a total number of calibration checks made of said redundant transmitter over the course of its service life to date; for each redundant transmitter, calculating a probability of calibration adjustment by dividing the total number of calibration adjustments by the total number of calibration checks; calculating a probability that all redundant transmitters in the group of redundant transmitters will require adjustment at the same time, based on the probabilities of calibration adjustment calculated for each redundant transmitter; calculating a probability of common mode drift by multiplying the calculated probability that all redundant transmitters in the group of redundant transmitters will require adjustment at the same time by the calculated probability that drift is occurring in a same direction for all redundant transmitters in the group of redundant transmitters; selecting a maximum probability of common-mode drift for the group of redundant transmitters; calculating an average time interval between calibrations for each redundant transmitter; calculating an average calibration interval by averaging the calculated average time interval between calibrations for each redundant transmitter; calculating a maximum interval based on the calculated probability of common mode drift, the calculated average calibration interval, and the maximum probability of common-mode drift for the group of redundant transmitters; calculating a backstop value from said calculated maximum interval, wherein said backstop value is greater than or equal to the average calibration interval, and wherein said backstop value is less than or equal to a maximum time span of plant calibration data.

In some example embodiments of the present general inventive concept, a method for monitoring transmitter drift within a group of redundant transmitters in a nuclear power plant comprises retrieving redundant output readings from said redundant transmitters; calculating an average of the retrieved output readings; calculating a deviation value for each redundant transmitter based on a differential between the output reading for that redundant transmitter and the calculated average of the retrieved output readings; identifying any transmitter with a deviation value in excess of a pre-determined magnitude; deriving a backstop value indicating an interval of time after which a calibration check should be made on at least one redundant transmitter in the group of redundant transmitters, by: calculating probability that drift is occurring in a same direction for all redundant transmitters in the group of redundant transmitters, based on the number of redundant transmitters in the group of redundant transmitters; for each redundant transmitter, calculating a total number of calibration adjustments made to said redundant transmitter over the course of its service life to date; for each redundant transmitter, calculating a total number of calibration checks made of said redundant transmitter over the course of its service life to date; for each redundant transmitter, calculating a probability of calibration adjustment by dividing the total number of calibration adjustments by the total number of calibration checks; calculating a probability that all redundant transmitters in the group of redundant transmitters will require adjustment at the same time, based on the probabilities of calibration adjustment calculated for each redundant transmitter; calculating a probability of common mode drift by multiplying the calculated probability that all redundant transmitters in the group of redundant transmitters will require adjustment at the same time by the calculated probability that drift is occurring in a same direction for all redundant transmitters in the group of redundant transmitters; selecting a maximum probability of common-mode drift for the group of redundant transmitters; calculating an average time interval between calibrations for each redundant transmitter; calculating an average calibration interval by averaging the calculated average time interval between calibrations for each redundant transmitter; calculating a maximum interval based on the calculated probability of common mode drift, the calculated average calibration interval, and the maximum probability of common-mode drift for the group of redundant transmitters; calculating a backstop value from said calculated maximum interval, wherein said backstop value is greater than or equal to the average calibration interval, and wherein said backstop value is less than or equal to a maximum time span of plant calibration data; supplying the calculated backstop value to an online monitoring system; and generating a report from said online monitoring system including the calculated backstop value.

Turning to the Figures, FIG. 1 illustrates a general diagram showing a number of components of a nuclear power plant, and in particular a PWR nuclear power plant, illustrating in general terms a number of redundant transmitter groups typically located within a nuclear power plant. As shown in FIG. 1, a nuclear power plant primary and secondary loop assembly 100 comprises a reactor 110, a pressurizer 120, a steam generator 130, and a reactor coolant pump 140. Among the illustrated example groups of redundant transmitters are: a group 200 of core exit thermocouple sensors 202, 204, 206; a nuclear instrumentation sensor group 300 comprising a plurality of nuclear instrumentation sensors 302, 304, 306; a group of flow sensors 400 monitoring flow within a coolant line 142 running to the reactor coolant pump 140; a level transmitter group 500 comprising level transmitters 502, 504, 506 and pressure transmitter group 550 comprising pressure transmitters 552, 554, 556, both attached to the pressurizer 120; a flow transmitter group 600 comprising flow transmitters 602, 604 attached to a main steam output line 132 conveying steam from the steam generator 130; a pressure transmitter group 700 comprising pressure transmitters attached to the main steam output line 132; and a level transmitter group 800 comprising level transmitters 802, 804, 806, 808 attached to the steam generator 130. In the illustrated example, most of the redundant transmitter groups comprise between two and four redundant transmitters. Typically, a PWR nuclear power plant has between 800 and 2,500 transmitters throughout the plant.

OLM allows a relatively smaller number of plant personnel to oversee a large number of transmitters, reducing the number of unnecessary calibrations and reducing overall operating costs for the nuclear power plant.

In implementing OLM, it can be assumed that the drift behavior of transmitters is random and follows a Gaussian (i.e., normal or bell shaped) probability distribution. This means that a transmitter is as likely to drift in the positive direction as it is to drift in the negative direction regardless of the direction of previous drift. Power plants implementing OLM must verify through an objective analysis that the drift behavior of their transmitters involved in the OLM program is random and follows a Gaussian distribution.

Figure 2:
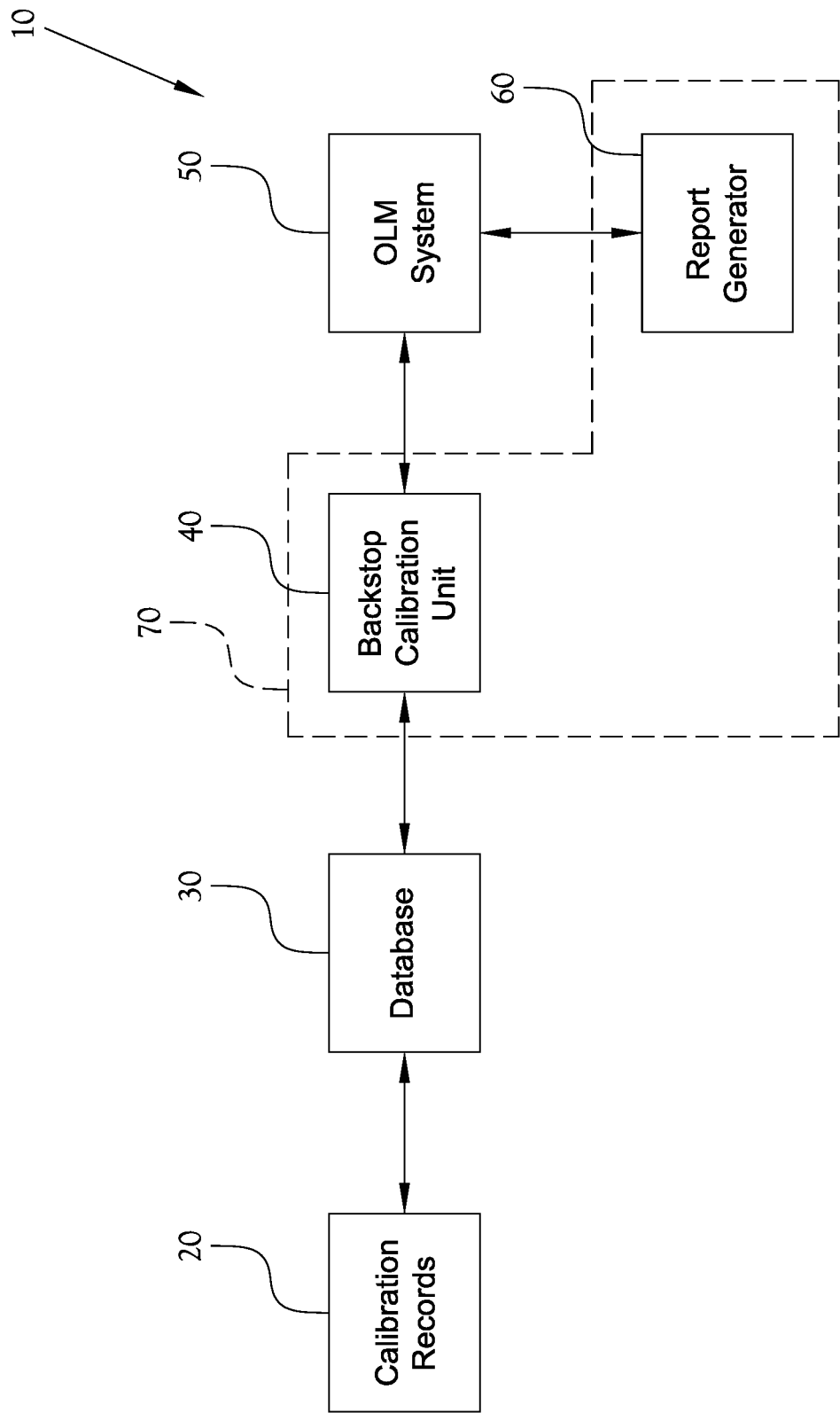
FIG. 2 is a flow diagram illustrating an example embodiment of a process for deriving a backstop for a group of redundant transmitters and incorporating that derived backstop into a report.

FIG. 2 shows a flow diagram illustrating, in general terms, according to one example embodiment of the present general inventive concept, a computing unit configured to calculate a backstop value based on received calibration data of the transmitters, and incorporating the backstop value(s) into a report to be used in guiding plant personnel in deciding which transmitters are to be checked for calibration based on the backstop value, for example during an outage. As shown in FIG. 2, the illustrated example computing unit process 10 including collecting or receiving calibration data from plant calibration records 20, for example by formatting calibration data from a database 30 according to pre-determined parameters usable by the OLM system 50. Backstop calculation unit 40 takes calibration data from the database 30 and uses that data, together with other inputs, to derive a backstop value for each group of redundant transmitters under review. The backstop calculation unit 40 provides the derived backstop values to OLM system 50, which incorporates the backstop values into a larger report 60 for the use of plant personnel. The report generator 60 can be configured to interface with the OLM system 50 to generate a report containing calibration information identifying transmitters calibrated according to the backstop value, transmitters calibrated due to output reading that deviate from pre-determined tolerances, and transmitters calibrated based on other factors, such as length of time of service. The computing unit 70 can include the backstop calculation unit 40 to interface with the database 30 to receive calibration data of the transmitters and a report generator 60 to interface with the OLM system 50 to generate a calibration report containing calibration information related to the various transmitters. The computing unit 70 can be configured as a single unit to include the backstop calculation unit 40 and report generator 60 to interface with the OLM system 50 and optionally the database 30 to retrieve calibration records from one or both of the database 30 and OLM system, or optionally the computing unit 70 can be integrated with the OLM system 50 and/or database 30 to receive and process the calibration data using the calibration records 20 and data from the OLM system to generate the calibration report. The computing unit 70 can also be configured as a separate unit from the OLM system 50 and database 30, in which case the computing unit 70 can be configured to interface with the OLM system to receive the calibration data from the OLM system and the calibration records from the database 30 (or to manually receive the calibration records via a user interface) to process the data in a suitable format and output the calibration report based on the calibration records and calibration data stored in the OLM system for a user.

For common-mode drift to occur, transmitters in a redundant group must all drift in the positive direction or all drift in the negative direction. The probability that drift occurs in the same direction is given by the equation:

$$P_S = 1/(2^{(n-1)}) \quad \text{(eq. 1)}$$

where n is the number of transmitters in a redundant group. Table 1 lists PS values for 2, 3, and 4-way redundant groups:

TABLE 1

Probability of Drift in Same Direction

| Number of Redundant Transmitters in Group | Probability of Same-Direction Drift (Ps) |
|---|---|
| 2 | 0.500 |
| 3 | 0.250 |
| 4 | 0.125 |

Using manual calibration records for each transmitter in a redundant group, determine how many calibration checks were performed, how many times the transmitter was adjusted, and the average time interval between calibration checks. Note that calibration adjustments are sometimes performed to improve the calibration even when the transmitter is not out of calibration which makes this approach more conservative. A transmitter is said to have been adjusted if its zero and/or span was changed during a calibration to bring its reading to within its as-left calibration tolerance.

Let $P_i$ denote the probability of each adjustment of the $i^{th}$ transmitter in a group of redundant transmitters. $P_i$ is calculated as follows:

$$P_i = \text{(number of calibration adjustments)/(number of calibration checks)} \quad \text{(eq. 2.1)}$$

In the alternative, $P_i$ is calculated as follows, using the total number of calibration adjustments that were required because the drift of that particular transmitter had exceeded a predetermined tolerance:

$$P_i = \frac{\text{(no. of required calibration adjustments from outside tolerance)}}{\text{(number of calibration checks)}} \quad \text{(eq. 2.2)}$$

Thus, a calibration adjustment value for any particular redundant transmitter generally can be derived either from (1) a total number of calibration adjustments made to said redundant transmitter over the course of said redundant transmitter's service life to date, or (2) a total number of calibration adjustments made to said redundant transmitter over the course of said redundant transmitter's service life to date where the calibration adjustment was made because said redundant transmitter displayed a drift value in excess of a pre-determined tolerance.

Let $P_A$ denote the probability that all redundant transmitters will need adjustment at the same time. $P_A$ is equal to the product of the individual $P_i$ values of every transmitter in the group of redundant transmitters for which a backstop is being derived.

The probability that redundant transmitters will need to be adjusted because they drifted in the same direction over the average time interval between calibrations—that is, the probability of common mode drift or $P_{CM}$—may be expressed as:

$$P_{CM} = P_S \times P_A \quad \text{(eq. 3)}$$

The probability of common-mode drift of a group of redundant transmitters increases as the time between calibrations is increased. The maximum value of this probability (Pmax) must be selected by the plant implementing OLM. For example, Pmax can be set at 5% for calculating the backstop. Once Pmax is selected, the plant can use the following equation to arrive at the maximum interval between calibrations:

$$\text{Max Interval} = (\text{Average Calibration Interval})(P_{MAX}/P_{CM})^2 \quad \text{(eq. 4)}$$

where the Average Calibration Interval is calculated in two steps: (1) calculate the average time interval between calibrations of each redundant transmitter for the installed history of the transmitter; and then (2) average the results of this calculation.

The backstop is equal to the maximum interval identified but bounded on the low side by the average calibration interval and on the high side by the time span of plant calibration data. If the backstop is less than the existing calibration frequency, then the existing calibration frequency must be used as the backstop. For example, if the average calibration interval is 18 months and the time span of plant calibration data is 20 years, then the backstop that is calculated should have a value between 18 months and 20 years. In this case, if the backstop turns out to be less than 18 months, it will still be set at 18 months and if it turns out to be greater than 20 years, it will still be set at 20 years.

The backstop calculated for existing transmitters can be used as is for any new transmitters of the same make and model. The backstop calculated for existing transmitters can be used for other transmitters of a different make or model for which an objective similarity analysis has verified that these other transmitters are equivalent to existing transmitters.

Backstops must be recalculated as more calibration data becomes available. This may result in longer or shorter backstops. Any recalculation of backstops must be verified and documented.

Figure 3:
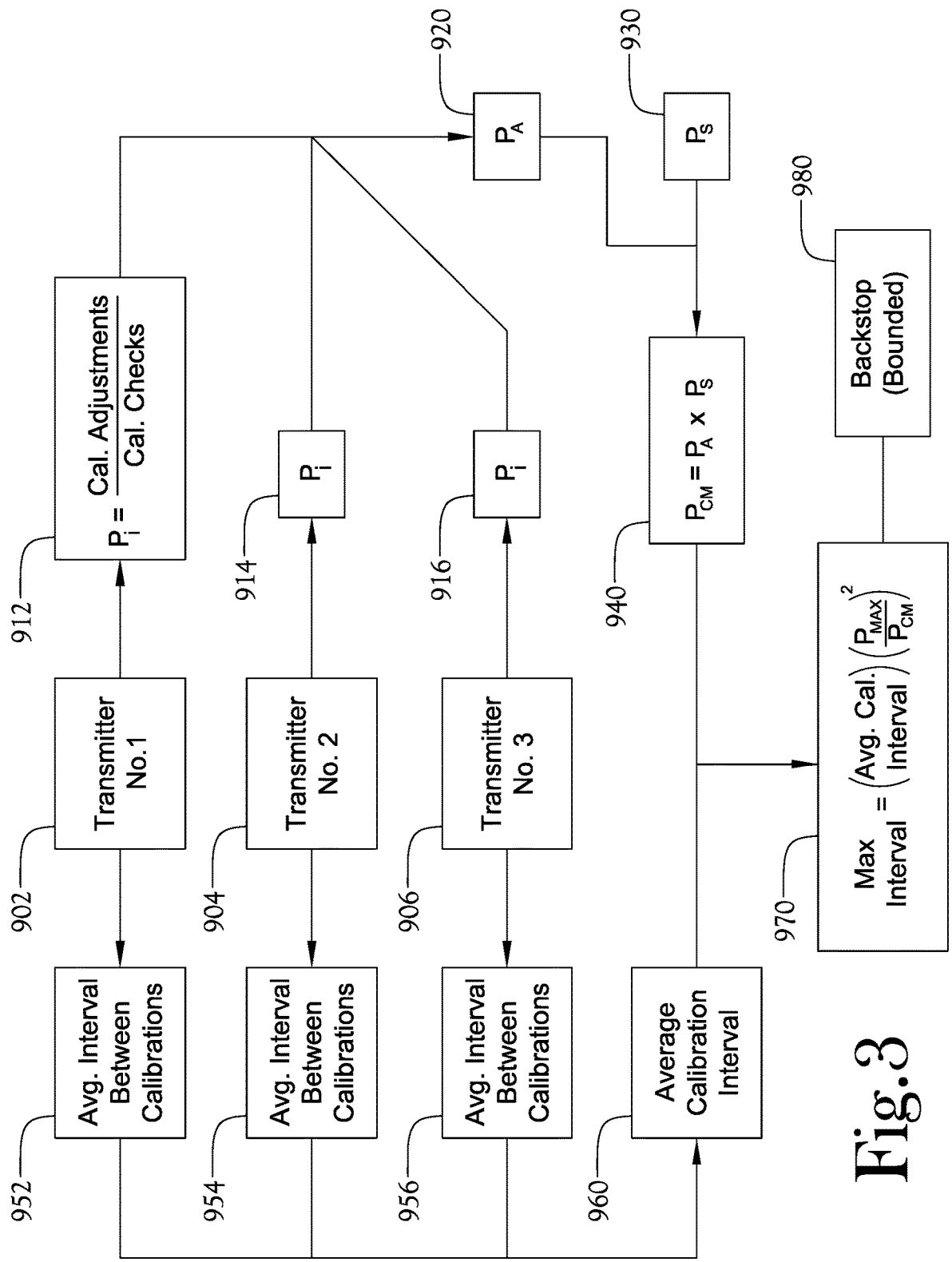
FIG. 3 is a flow diagram illustrating an example embodiment of a process for deriving a backstop for a group of redundant transmitters.

FIG. 3 encompasses a flow diagram illustrating in general terms a process or method for determining a backstop value for a group of redundant transmitters. As shown in FIG. 3, for each transmitter 902, 904, 906 in a group of redundant transmitters, a $P_i$ 912, 914, 916 is calculated, as described above; namely, for each redundant transmitter, calculating a total number of calibration adjustments made to said redundant transmitter over the course of its service life to date; for each redundant transmitter, calculating a total number of calibration checks made of said redundant transmitter over the course of its service life to date; for each redundant transmitter, calculating a probability of calibration adjustment by dividing the total number of calibration adjustments by the total number of calibration checks. A probability $P_A$ 920 that all redundant transmitters in the group of redundant transmitters will require adjustment at the same time, based on a product of the probabilities of calibration adjustment calculated for each redundant transmitter 902, 904, 906, is calculated. The calculated probability $P_A$ 920 is then multiplied with a probability $P_S$ 930 that drift is occurring in a same direction for all redundant transmitters in the group of redundant transmitters, based on the number of redundant transmitters in the group of redundant transmitters. The product of multiplying $P_A$ 920 by $P_S$ 930 gives a probability of common mode drift $P_{CM}$ 940. For each transmitter 902, 904, 906 in the group of redundant transmitters, an average time interval between calibrations 952, 954, 956 is calculated based on the calibration history of that transmitter; an average calibration interval 960 is derived by averaging the calculated average time interval between calibrations for each redundant transmitter. A maximum interval is calculated 970 based on the calculated probability of common mode drift 940, the calculated average calibration interval 960, and a selected maximum probability of common-mode drift for the group of redundant transmitters. A bounded backstop value for the group of redundant transmitters is derived 980 based on said calculated maximum interval; the backstop value must be greater than or equal to the average calibration interval, and at the same time the backstop value must be less than or equal to a maximum time span of plant calibration data.

Example Number 1

Table 2 below summarizes the calculated inputs for deriving the backstops for a number of transmitter groups in one example nuclear power plant, according to one example embodiment of the present general inventive concept.

TABLE 2

Backstop Calculations for PWR Unit 1

| XMTR Set | XMTR ID | Service | # Adjusts | Total Records | P | PCM | Avg. Cal. Interval (Years) | Max Interval (Years) | Cal Date Range (Years) | Backstop (Years) |
|---|---|---|---|---|---|---|---|---|---|---|
| 1 | 1 | Aux FW Flow | 3 | 5 | 0.600 | 0.003 | 1.6 | 630.8 | 7.7 | 7.7 |
|  | 2 |  | 1 | 5 | 0.200 |  |  |  |  |  |
|  | 3 |  | 3 | 6 | 0.500 |  |  |  |  |  |
|  | 4 |  | 2 | 6 | 0.333 |  |  |  |  |  |
| 2 | 5 | Ctmt Pressure | 3 | 13 | 0.231 | 0.000 | 1.5 | 2410266.1 | 19.5 | 19.5 |
|  | 6 |  | 1 | 13 | 0.077 |  |  |  |  |  |
|  | 7 |  | 1 | 13 | 0.077 |  |  |  |  |  |
|  | 8 |  | 3 | 13 | 0.231 |  |  |  |  |  |
| 3 | 9 | Pzr Pressure | 8 | 13 | 0.615 | 0.013 | 1.5 | 21.8 | 19.5 | 19.5 |
|  | 10 |  | 10 | 13 | 0.769 |  |  |  |  |  |
|  | 11 |  | 5 | 13 | 0.385 |  |  |  |  |  |
|  | 12 |  | 8 | 14 | 0.571 |  |  |  |  |  |
| 4 | 13 | RCP | 2 | 6 | 0.333 | 0.002 | 1.9 | 1609.9 | 12.0 | 12.0 |
|  | 14 | Thermal | 3 | 7 | 0.429 |  |  |  |  |  |
|  | 15 | Barrier | 2 | 7 | 0.286 |  |  |  |  |  |
|  | 16 | ACCW Flow | 2 | 6 | 0.333 |  |  |  |  |  |
|  | 17 | RCS WR | 3 | 6 | 0.500 |  |  |  |  |  |
|  | 18 | Pressure Transmitter | 1 | 6 | 0.167 |  |  |  |  |  |
| 6 | 19 | EHC Pressure | 6 | 12 | 0.500 | 0.017 | 1.5 | 12.3 | 19.4 | 12.3 |
|  | 20 |  | 5 | 12 | 0.417 |  |  |  |  |  |
|  | 21 |  | 4 | 12 | 0.333 |  |  |  |  |  |
| 7 | 22 | Main Steam | 4 | 8 | 0.500 | 0.011 | 1.4 | 28.0 | 14.0 | 14.0 |
|  | 23 | Pressure Loop 1 | 3 | 10 | 0.300 |  |  |  |  |  |
|  | 24 |  | 3 | 10 | 0.300 |  |  |  |  |  |
| 8 | 25 | Main Steam | 4 | 9 | 0.444 | 0.004 | 1.4 | 254.1 | 12.9 | 12.9 |
|  | 26 | Pressure Loop 2 | 1 | 10 | 0.100 |  |  |  |  |  |
|  | 27 |  | 3 | 9 | 0.333 |  |  |  |  |  |

TABLE 2-continued

Backstop Calculations for PWR Unit 1

| XMTR Set | XMTR ID | Service | # Adjusts | Total Records | P | PCM | Avg. Cal. Interval (Years) | Max Interval (Years) | Cal Date Range (Years) | Backstop (Years) |
|---|---|---|---|---|---|---|---|---|---|---|
| 9 | 28 | Main Steam | 5 | 9 | 0.556 | 0.002 | 1.4 | 1225.9 | 12.9 | 12.9 |
|   | 29 | Pressure Loop 3 | 1 | 9 | 0.111 |   |   |   |   |   |
|   | 30 |   | 1 | 9 | 0.111 |   |   |   |   |   |
| 10 | 31 | Main Steam | 2 | 13 | 0.154 | 0.004 | 1.5 | 245.5 | 13.0 | 13.0 |
|   | 32 | Pressure Loop 4 | 3 | 10 | 0.300 |   |   |   |   |   |
|   | 33 |   | 3 | 9 | 0.333 |   |   |   |   |   |
| 11 | 34 | Steam Generator | 7 | 8 | 0.875 | 0.219 | 1.4 | 0.1 | 10.4 | 1.5 |
|   | 35 | Narrow Range | 8 | 8 | 1.000 |   |   |   |   |   |
|   | 36 | Level Loop 1 | 7 | 7 | 1.000 |   |   |   |   |   |
| 12 | 37 | SG NR | 8 | 8 | 1.000 | 0.125 | 1.5 | 0.2 | 6.0 | 1.5 |
|   | 38 | Level Loop 2 | 2 | 4 | 0.500 |   |   |   |   |   |
|   | 39 |   | 4 | 4 | 1.000 |   |   |   |   |   |
| 13 | 40 | SG NR | 9 | 12 | 0.750 | 0.188 | 1.5 | 0.1 | 6.0 | 1.5 |
|   | 41 | Level Loop 3 | 4 | 4 | 1.000 |   |   |   |   |   |
|   | 42 |   | 4 | 4 | 1.000 |   |   |   |   |   |
| 14 | 43 | SG NR | 6 | 12 | 0.500 | 0.094 | 1.5 | 0.4 | 6.0 | 1.5 |
|   | 44 | Level Loop 4 | 3 | 4 | 0.750 |   |   |   |   |   |
|   | 45 |   | 8 | 8 | 1.000 |   |   |   |   |   |
| 15 | 46 | RCS Flow | 6 | 12 | 0.500 | 0.036 | 1.5 | 2.8 | 18.0 | 2.8 |
|   | 47 | Loop 1 | 7 | 12 | 0.583 |   |   |   |   |   |
|   | 48 |   | 6 | 12 | 0.500 |   |   |   |   |   |
| 16 | 49 | RCS Flow | 2 | 12 | 0.167 | 0.008 | 1.5 | 56.9 | 18.0 | 18.0 |
|   | 50 | Loop 2 | 5 | 12 | 0.417 |   |   |   |   |   |
|   | 51 |   | 6 | 13 | 0.462 |   |   |   |   |   |
| 17 | 52 | RCS Flow | 5 | 12 | 0.417 | 0.011 | 1.5 | 31.9 | 18.0 | 18.0 |
|   | 53 | Loop 3 | 5 | 12 | 0.417 |   |   |   |   |   |
|   | 54 |   | 3 | 12 | 0.250 |   |   |   |   |   |
| 18 | 55 | RCS Flow | 4 | 12 | 0.333 | 0.009 | 1.5 | 41.6 | 16.4 | 16.4 |
|   | 56 | Loop 4 | 3 | 11 | 0.273 |   |   |   |   |   |
|   | 57 |   | 5 | 12 | 0.417 |   |   |   |   |   |
| 19 | 58 | Pzr Level | 4 | 9 | 0.444 | 0.037 | 1.5 | 2.7 | 7.5 | 2.7 |
|   | 59 |   | 2 | 5 | 0.400 |   |   |   |   |   |
|   | 60 |   | 5 | 6 | 0.833 |   |   |   |   |   |

Figure 4:
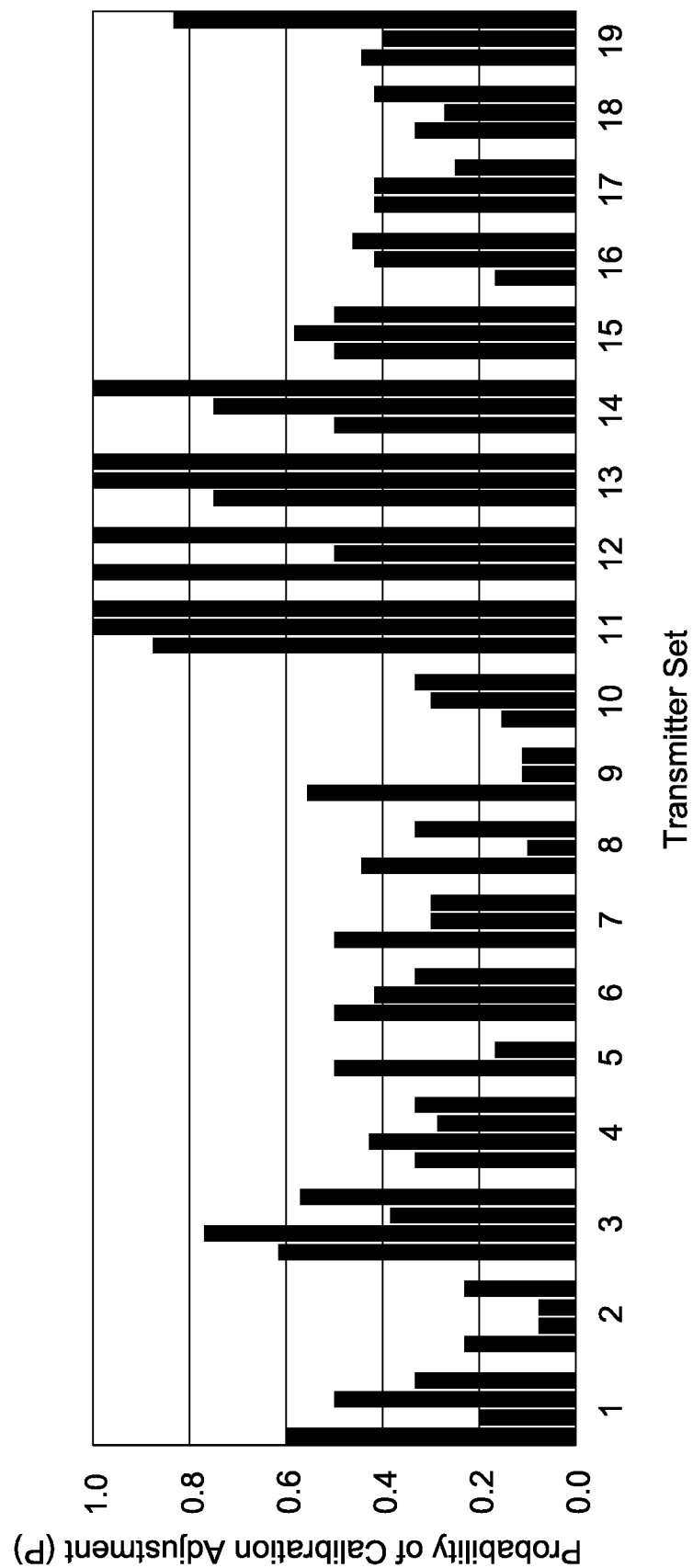
FIGS. 4-9 are graphical outputs generated by example embodiments of the present general inventive concept.
Figure 5:
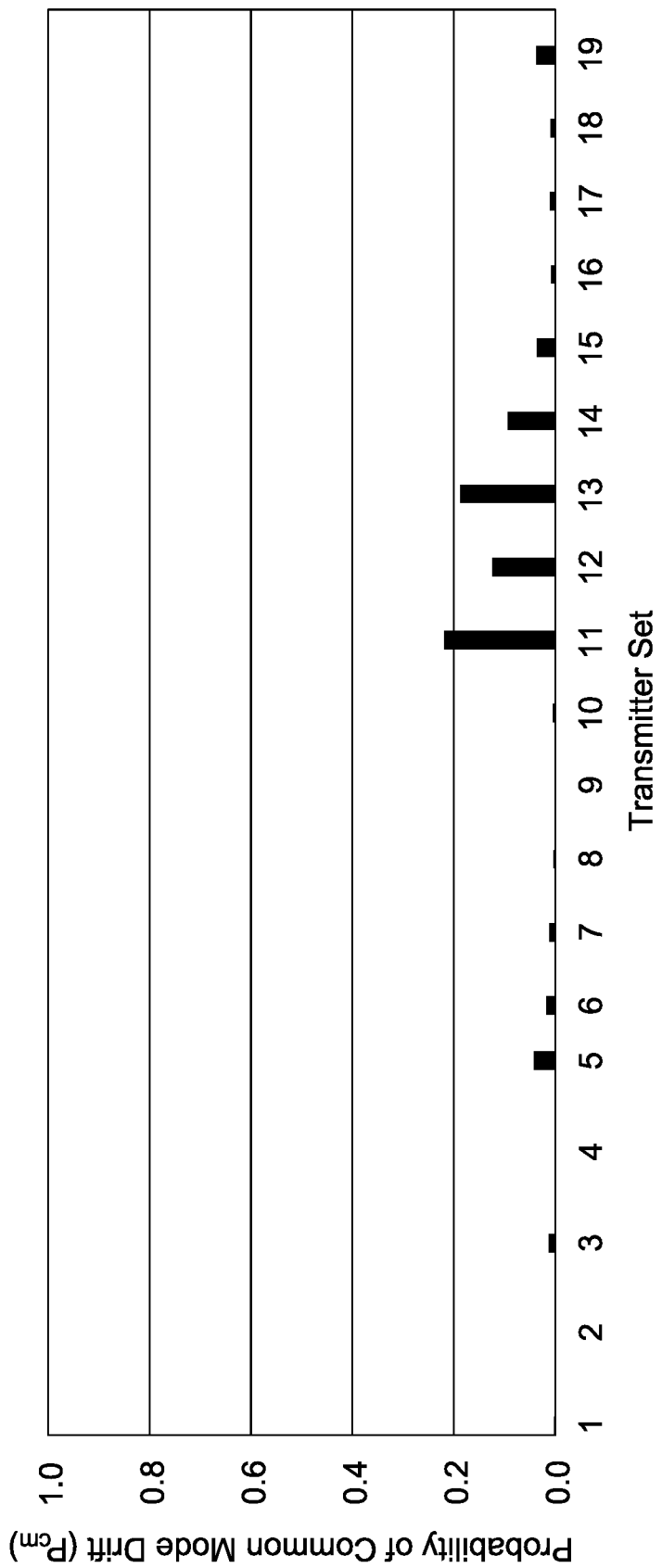
Figure 6:
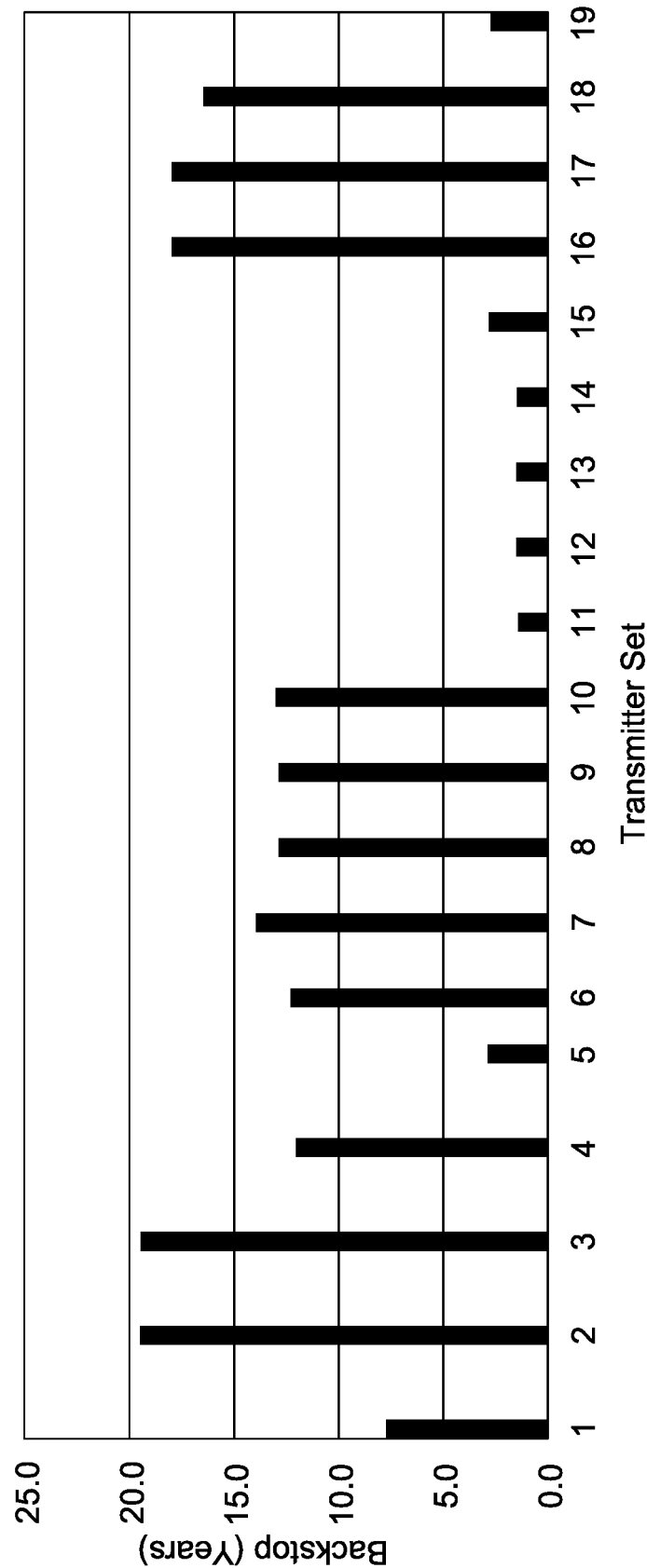

Some of the calculated or derived values displayed in Table 2 are presented in graphical form in FIG. 4 (probability of calibration adjustment for each transmitter in each group of transmitters), FIG. 5 (calculated probability of common mode drift for each group of transmitters), and FIG. 6 (derived backstop for each group of transmitters).

The data and calculated values shown in Table 2 and in FIGS. 4-6 are provided for exemplary and illustrative purposes only. The data and calculated values shown here are not meant to be limiting or to define calculated backstop values for transmitter groups in other nuclear facilities.

Example Number 2

Table 3 below summarizes the calculated inputs for deriving the backstops for a number of transmitter groups in one example nuclear power plant, according to one example embodiment of the present general inventive concept.

TABLE 3

Backstop Calculations for PWR Unit 2

| XMTR Set | XMTR ID | Service | # Adjusts | Total Records | P | PCM | Avg. Cal. Interval (Years) | Max Interval (Years) | Cal Date Range (Years) | Backstop (Years) |
|---|---|---|---|---|---|---|---|---|---|---|
| 1 | 1 | Aux FW Flow | 3 | 5 | 0.600 | 0.006 | 1.5 | 96.7 | 6.1 | 6.1 |
|   | 2 |   | 2 | 6 | 0.333 |   |   |   |   |   |
|   | 3 |   | 2 | 4 | 0.500 |   |   |   |   |   |
|   | 4 |   | 3 | 6 | 0.500 |   |   |   |   |   |
| 2 | 5 | Ctmt Pressure | 1 | 13 | 0.077 | 0.000 | 1.5 | 5423098.7 | 19.3 | 19.3 |
|   | 6 |   | 3 | 13 | 0.231 |   |   |   |   |   |
|   | 7 |   |   | 13 | 0.077 |   |   |   |   |   |
|   | 8 |   | 2 | 13 | 0.154 |   |   |   |   |   |
| 3 | 9 | Pzr Pressure | 10 | 13 | 0.769 | 0.013 | 1.5 | 21.6 | 19.4 | 19.4 |
|   | 10 |   | 10 | 13 | 0.769 |   |   |   |   |   |
|   | 11 |   | 10 | 13 | 0.769 |   |   |   |   |   |
|   | 12 |   | 3 | 13 | 0.231 |   |   |   |   |   |
| 4 | 13 | RCP Thermal | 1 | 5 | 0.200 | 0.001 | 3.0 | 20717.6 | 14.9 | 14.9 |
|   | 14 | Barrier | 1 | 5 | 0.200 |   |   |   |   |   |
|   | 15 | ACCW Flow | 1 | 5 | 0.200 |   |   |   |   |   |
|   | 16 |   | 3 | 5 | 0.600 |   |   |   |   |   |

TABLE 3-continued

Backstop Calculations for PWR Unit 2

| XMTR Set | XMTR ID | Service | # Adjusts | Total Records | P | PCM | Avg. Cal. Interval (Years) | Max Interval (Years) | Cal Date Range (Years) | Backstop (Years) |
|---|---|---|---|---|---|---|---|---|---|---|
| 5 | 17 | RCS WR | 1 | 5 | 0.200 | 0.020 | 3.0 | 18.6 | 14.9 | 14.9 |
|   | 18 | Pressure Transmitter | 1 | 5 | 0.200 |   |   |   |   |   |
| 6 | 19 | Turbine First | 4 | 10 | 0.400 | 0.100 | 1.5 | 0.4 | 16.3 | 1.5 |
|   | 20 | Stage Pressure | 5 | 10 | 0.500 |   |   |   |   |   |
| 7 | 21 | EHC Pressure | 7 | 13 | 0.538 | 0.044 | 1.5 | 1.9 | 19.5 | 1.9 |
|   | 22 |   | 10 | 14 | 0.714 |   |   |   |   |   |
|   | 23 |   | 6 | 13 | 0.462 |   |   |   |   |   |
| 8 | 24 | Main Steam | 4 | 10 | 0.400 | 0.042 | 1.4 | 1.9 | 13.3 | 1.9 |
|   | 25 | Pressure Loop 1 | 5 | 10 | 0.500 |   |   |   |   |   |
|   | 26 |   | 11 | 13 | 0.846 |   |   |   |   |   |
| 9 | 27 | Main Steam | 1 | 10 | 0.100 | 0.002 | 1.4 | 673.5 | 12.8 | 12.8 |
|   | 28 | Pressure Loop 2 | 3 | 10 | 0.300 |   |   |   |   |   |
|   | 29 |   | 3 | 10 | 0.300 |   |   |   |   |   |
| 10 | 30 | Main Steam | 3 | 10 | 0.300 | 0.004 | 1.4 | 206.0 | 12.8 | 12.8 |
|   | 31 | Pressure Loop 3 | 1 | 10 | 0.100 |   |   |   |   |   |
|   | 32 |   | 5 | 9 | 0.556 |   |   |   |   |   |
| 11 | 33 | Main Steam | 5 | 10 | 0.500 | 0.031 | 1.3 | 3.4 | 13.2 | 3.4 |
|   | 34 | Pressure Loop 4 | 5 | 10 | 0.500 |   |   |   |   |   |
|   | 35 |   | 3 | 10 | 0.500 |   |   |   |   |   |
| 12 | 36 | SG NR | 6 | 9 | 0.667 | 0.070 | 1.5 | 0.8 | 7.4 | 1.5 |
|   | 37 | Level Loop 1 | 7 | 10 | 0.700 |   |   |   |   |   |
|   | 38 |   | 3 | 5 | 0.600 |   |   |   |   |   |
| 13 | 39 | SG NR | 6 | 8 | 0.750 | 0.068 | 1.5 | 0.8 | 7.4 | 1.5 |
|   | 40 | Level Loop 2 | 3 | 5 | 0.600 |   |   |   |   |   |
|   | 41 |   | 3 | 5 | 0.600 |   |   |   |   |   |
| 14 | 42 | SG NR | 6 | 8 | 0.750 | 0.079 | 1.5 | 0.6 | 7.4 | 1.5 |
|   | 43 | Level Loop 3 | 3 | 5 | 0.600 |   |   |   |   |   |
|   | 44 |   | 7 | 10 | 0.700 |   |   |   |   |   |
| 15 | 45 | SG NR | 8 | 9 | 0.889 | 0.111 | 1.5 | 0.3 | 7.4 | 1.5 |
|   | 46 | Level Loop 4 | 4 | 8 | 0.500 |   |   |   |   |   |
|   | 47 |   | 5 | 5 | 1.000 |   |   |   |   |   |
| 16 | 48 | RWST Level | 6 | 14 | 0.429 | 0.008 | 1.5 | 62.2 | 19.8 | 19.8 |
|   | 49 |   | 3 | 14 | 0.214 |   |   |   |   |   |
|   | 50 |   | 4 | 12 | 0.333 |   |   |   |   |   |
| 17 | 31 | RCS Flow | 3 | 6 | 0.500 | 0.042 | 1.5 | 2.1 | 8.9 | 2.1 |
|   | 52 | Loop 1 | 4 | 6 | 0.667 |   |   |   |   |   |
|   | 33 |   | 3 | 6 | 0.500 |   |   |   |   |   |
| 18 | 54 | RCS Flow | 1 | 5 | 0.200 | 0.008 | 1.6 | 66.9 | 8.9 | 8.9 |
|   | 55 | Loop 2 | 4 | 6 | 0.667 |   |   |   |   |   |
|   | 56 |   | 3 | 13 | 0.231 |   |   |   |   |   |
| 19 | 57 | RCS Flow | 2 | 6 | 0.333 | 0.009 | 1.5 | 43.3 | 8.9 | 8.9 |
|   | 58 | Loop 3 | 2 | 6 | 0.333 |   |   |   |   |   |
|   | 59 |   | 4 | 12 | 0.333 |   |   |   |   |   |
| 20 | 60 | RCS Flow | 2 | 6 | 0.333 | 0.028 | 1.5 | 4.8 | 8.9 | 4.8 |
|   | 61 | Loop 4 | 4 | 6 | 0.667 |   |   |   |   |   |
|   | 62 |   | 3 | 6 | 0.500 |   |   |   |   |   |
| 21 | 63 | Pzr Level | 7 | 13 | 0.538 | 0.115 | 1.5 | 0.3 | 4.4 | 1.5 |
|   | 64 |   | 3 | 3 | 1.000 |   |   |   |   |   |
|   | 65 |   | 6 | 7 | 0.857 |   |   |   |   |   |

Figure 7:
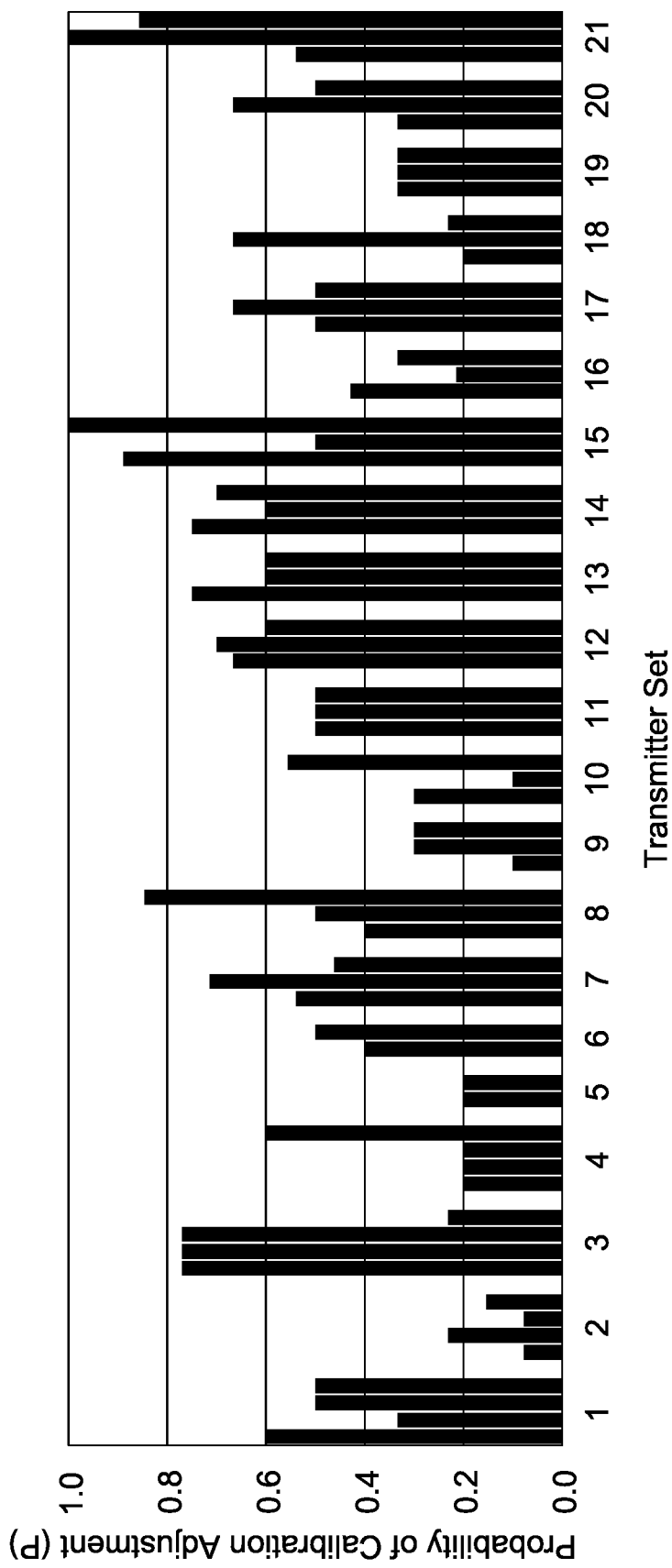
Figure 8:
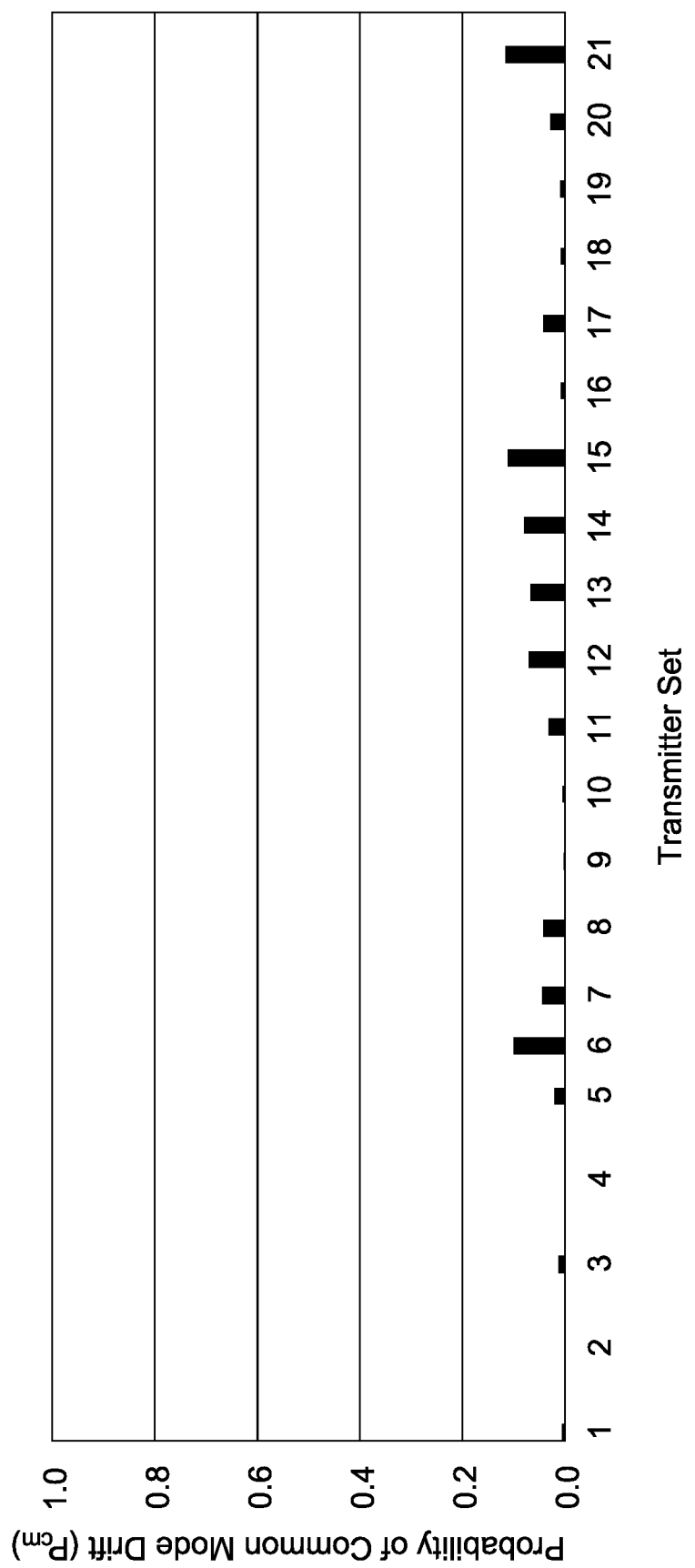
Figure 9:
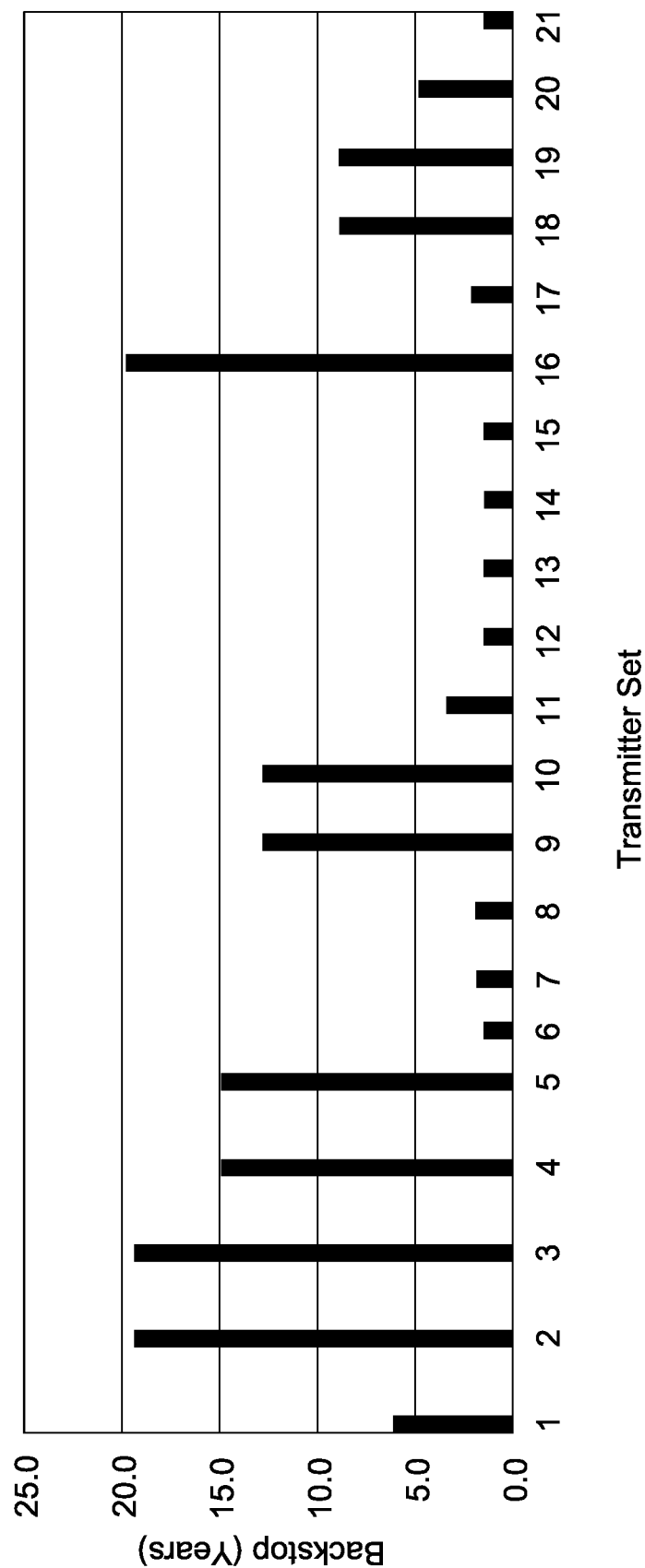

Some of the calculated or derived values displayed in Table 3 are presented in graphical form in FIG. 7 (probability of calibration adjustment for each transmitter in each group of transmitters), FIG. 8 (calculated probability of common mode drift for each group of transmitters), and FIG. 9 (derived backstop for each group of transmitters).

The data and calculated values shown in Table 3 and in FIGS. 7-9 are provided for exemplary and illustrative purposes only. The data and calculated values shown here are not meant to be limiting or to define calculated backstop values for transmitter groups in other nuclear facilities.

In some example embodiments of the present general inventive concept, a system for monitoring transmitter drift within a group of redundant transmitters in a power plant comprises a data acquisition unit in communication with the redundant transmitters and configured to retrieve output readings from said redundant transmitters; and a computing unit configured to interface with the data acquisition unit and configured to record retrieved output readings from the data acquisition unit, wherein said computing unit can include an executable software routine configured to process the calibration records to calculate a backstop value indicating an interval of time after which at least one redundant transmitter in the group of redundant transmitters should be checked for calibration, wherein said backstop value is derived by: calculating probability that drift is occurring in a same direction for all redundant transmitters in the group of redundant transmitters, based on the number of redundant transmitters in the group of redundant transmitters; for each redundant transmitter, calculating a total number of calibration adjustments made to said redundant transmitter over the course of its service life to date; for each redundant transmitter, calculating a total number of calibration checks made of said redundant transmitter over the course of its service life to date; for each redundant transmitter, calculating a probability of calibration adjustment by dividing the total number of calibration adjustments by the total number of calibration checks; calculating a probability that all redundant transmitters in the group of redundant transmitters will require adjustment at the same time, based on the probabilities of calibration adjustment calculated for each redundant transmitter; calculating a probability of common mode drift by multiplying the calculated probability that all redundant transmitters in the group of redundant transmitters will require adjustment at the same time by the calculated probability that drift is occurring in a same direction for all redundant transmitters in the group of redundant transmitters; selecting a maximum probability of common-mode drift for the group of redundant transmitters; calculating an average time interval between calibrations for each redundant transmitter; calculating an average calibration interval by averaging the calculated average time interval between calibrations for each redundant transmitter; calculating a maximum interval based on the calculated probability of common mode drift, the calculated average calibration interval, and the maximum probability of common-mode drift for the group of redundant transmitters; calculating a backstop value from said calculated maximum interval, wherein said backstop value is greater than or equal to the average calibration interval, and wherein said backstop value is less than or equal to a maximum time span of plant calibration data.

In some embodiments, the calibration adjustment value for a redundant transmitter is derived from a total number of calibration adjustments made to said redundant transmitter over the course of said redundant transmitter's service life to date.

In some embodiments, the calibration adjustment value for a redundant transmitter is derived from a total number of calibration adjustments made to said redundant transmitter over the course of said redundant transmitter's service life to date where the calibration adjustment was made because said redundant transmitter displayed a drift value in excess of a pre-determined tolerance.

In some embodiments, the redundant transmitters include pressure sensors.

In some embodiments, the redundant transmitters include differential pressure sensors.

In some example embodiments of the present general inventive concept, a method for deriving a backstop value indicating an interval of time after which a calibration check should be made on at least one redundant transmitter in a group of redundant transmitters in a power plant comprises: providing a data acquisition system in communication with the redundant transmitters and configured to retrieve output readings from said redundant transmitters; calculating probability that drift is occurring in a same direction for all redundant transmitters in the group of redundant transmitters, based on the number of redundant transmitters in the group of redundant transmitters; for each redundant transmitter, calculating a calibration adjustment value for said redundant transmitter; for each redundant transmitter, calculating a total number of calibration checks made of said redundant transmitter over the course of its service life to date; for each redundant transmitter, calculating a probability of calibration adjustment by dividing the total number of calibration adjustments by the total number of calibration checks; calculating a probability that all redundant transmitters in the group of redundant transmitters will require adjustment at the same time, based on the probabilities of calibration adjustment calculated for each redundant transmitter; calculating a probability of common mode drift by multiplying the calculated probability that all redundant transmitters in the group of redundant transmitters will require adjustment at the same time by the calculated probability that drift is occurring in a same direction for all redundant transmitters in the group of redundant transmitters; selecting a maximum probability of common-mode drift for the group of redundant transmitters; calculating an average time interval between calibrations for each redundant transmitter; calculating an average calibration interval by averaging the calculated average time interval between calibrations for each redundant transmitter; calculating a maximum interval based on the calculated probability of common mode drift, the calculated average calibration interval, and the maximum probability of common-mode drift for the group of redundant transmitters; calculating a backstop value from said calculated maximum interval, wherein said backstop value is greater than or equal to the average calibration interval, and wherein said backstop value is less than or equal to a maximum time span of plant calibration data.

Some embodiments further comprise: providing a computing unit that includes an executable software routine configured to calculate the backstop value; and said computing unit generating a report including the calculated backstop value for the group of redundant transmitters.

In some embodiments, the calibration adjustment value for a redundant transmitter is derived from a total number of calibration adjustments made to said redundant transmitter over the course of said redundant transmitter's service life to date.

In some embodiments, the calibration adjustment value for a redundant transmitter is derived from a total number of calibration adjustments made to said redundant transmitter over the course of said redundant transmitter's service life to date where the calibration adjustment was made because said redundant transmitter displayed a drift value in excess of a pre-determined tolerance. In some embodiments, the power plant is a nuclear power plant.

In some embodiments, the power plant is a pressurized water reactor nuclear power plant or a boiling water nuclear power plant. This can be used at PWR, BWR, AP1000, etc.

In some embodiments, the redundant transmitters include pressure sensors.

In some embodiments, the redundant transmitters include differential pressure sensors.

In some example embodiments of the present general inventive concept, a method for monitoring transmitter drift within a group of redundant transmitters in a power plant in a power plant comprises: retrieving redundant output readings from said redundant transmitters; calculating an average of the retrieved output readings; calculating a deviation value for each redundant transmitter based on a differential between the output reading for that redundant transmitter and the calculated average of the retrieved output readings; identifying any transmitter with a deviation value in excess of a pre-determined magnitude; and deriving a backstop value indicating an interval of time after which a calibration check should be made on at least one redundant transmitter in the group of redundant transmitters, by: calculating probability that drift is occurring in a same direction for all redundant transmitters in the group of redundant transmitters, based on the number of redundant transmitters in the group of redundant transmitters; for each redundant transmitter, calculating a total number of calibration adjustments made to said redundant transmitter over the course of its service life to date, or a total number of calibration adjustments made to said redundant transmitter over the course of said redundant transmitter's service life to date where the calibration adjustment was made because said redundant transmitter displayed a drift value in excess of a pre-determined tolerance; for each redundant transmitter, calculating a total number of calibration checks made of said redundant transmitter over the course of its service life to date; for each redundant transmitter, calculating a probability of calibration adjustment by dividing the total number of calibration adjustments by the total number of calibration checks; calculating a probability that all redundant transmitters in the group of redundant transmitters will require adjustment at the same time, based on the probabilities of calibration adjustment calculated for each redundant transmitter; calculating a probability of common mode drift by multiplying the calculated probability that all redundant transmitters in the group of redundant transmitters will require adjustment at the same time by the calculated probability that drift is occurring in a same direction for all redundant transmitters in the group of redundant transmitters; selecting a maximum probability of common-mode drift for the group of redundant transmitters; calculating an average time interval between calibrations for each redundant transmitter; calculating an average calibration interval by averaging the calculated average time interval between calibrations for each redundant transmitter; calculating a maximum interval based on the calculated probability of common mode drift, the calculated average calibration interval, and the maximum probability of common-mode drift for the group of redundant transmitters; calculating a backstop value from said calculated maximum interval, wherein said backstop value is greater than or equal to the average calibration interval, and wherein said backstop value is less than or equal to a maximum time span of plant calibration data.

In some embodiments, the power plant is a nuclear power plant.

In some embodiments, the power plant is a pressurized water reactor nuclear power plant.

In some embodiments, the redundant transmitters include pressure sensors.

In some embodiments, the redundant transmitters include differential pressure sensors.

In some example embodiments of the present general inventive concept, a method for monitoring transmitter drift within a group of redundant transmitters in a nuclear power plant comprises retrieving redundant output readings from said redundant transmitters; calculating an average of the retrieved output readings; calculating a deviation value for each redundant transmitter based on a differential between the output reading for that redundant transmitter and the calculated average of the retrieved output readings; identifying any transmitter with a deviation value in excess of a pre-determined magnitude; deriving a backstop value indicating an interval of time after which a calibration check should be made on at least one redundant transmitter in the group of redundant transmitters, by: calculating probability that drift is occurring in a same direction for all redundant transmitters in the group of redundant transmitters, based on the number of redundant transmitters in the group of redundant transmitters; for each redundant transmitter, calculating a total number of calibration adjustments made to said redundant transmitter over the course of its service life to date; for each redundant transmitter, calculating a total number of calibration checks made of said redundant transmitter over the course of its service life to date; for each redundant transmitter, calculating a probability of calibration adjustment by dividing the total number of calibration adjustments by the total number of calibration checks; calculating a probability that all redundant transmitters in the group of redundant transmitters will require adjustment at the same time, based on the probabilities of calibration adjustment calculated for each redundant transmitter; calculating a probability of common mode drift by multiplying the calculated probability that all redundant transmitters in the group of redundant transmitters will require adjustment at the same time by the calculated probability that drift is occurring in a same direction for all redundant transmitters in the group of redundant transmitters; selecting a maximum probability of common-mode drift for the group of redundant transmitters; calculating an average time interval between calibrations for each redundant transmitter; calculating an average calibration interval by averaging the calculated average time interval between calibrations for each redundant transmitter; calculating a maximum interval based on the calculated probability of common mode drift, the calculated average calibration interval, and the maximum probability of common-mode drift for the group of redundant transmitters; calculating a backstop value from said calculated maximum interval, wherein said backstop value is greater than or equal to the average calibration interval, and wherein said backstop value is less than or equal to a maximum time span of plant calibration data; supplying the calculated backstop value to online monitoring system; and generating a report from said online monitoring system including the calculated backstop value.

As described herein, the systems, apparatus, methods, processes, control systems, functions, and/or operations and software for implementing the example embodiments of the present general inventive concept, for example the processing, and computing units, may be wholly or partially implemented in the form of apparatus that includes processing elements and sets of executable instructions. The executable instructions may be part of one or more software applications and arranged into software architecture. In general, embodiments of the present general inventive concept may be implemented using a set of software instructions that are designed to be executed by a suitably programmed processing element (such as a CPU, GPU (graphics processing unit), microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

The application modules may include any suitable computer executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. The computer-executable code or set of instructions may be stored in (or on) any suitable non-transitory computer-readable medium. In general, with regards to the embodiments described herein, a non-transitory computer-readable medium may include almost any structure, technology or method apart from a transitory waveform or similar medium.

As described, the computing unit and data acquisition and processing systems, apparatus, methods, processes, functions, software and/or operations for implementing the example embodiments of the present general inventive concept may be wholly or partially implemented in the form of a set of instructions executed by one or more programmed computer processors such as a central processing unit (CPU) or microprocessor. Such processors may be incorporated in the circuitry and components of an apparatus, server, client or other computing or data processing device operated by, or in communication with, other components of the system.

It should be understood that the modules or operations of the present general inventive concept as described and illustrated herein can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes, modules, or functions described in this application may be implemented as software code to be executed by a processor using any suitable computer language such as, for example, Java, JavaScript, C++, LabVIEW, or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus, and may be present on or within different computational apparatuses within a system or network.

According to some example implementations, the term data acquisition and processing unit and/or the computing unit can be referred to as a control system, processing unit, or processor, as used herein, which may be a central processing unit (CPU), or conceptualized as a CPU (such as a virtual machine). In such example implementation, the CPU or a device in which the CPU is incorporated may be coupled; connected, and/or in communication with one or more peripheral devices such as, but not limited to, an electrochemical impedance spectroscopy (EIS), as well as one or more displays. In other example implementations, the processing unit or processor or computing unit may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to configurations, functions, processes, or methods. It will be understood that one or more of the configurations, methods, processes, and functions can be implemented by computer-executable program instructions. Note that in some embodiments, one or more of the configurations, methods, processes, systems, and functions may not necessarily need to be performed in a particular order, or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, systems, or methods described herein.

These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

As a defense against common-mode drift, one transmitter from each group of redundant transmitters involved in OLM can be checked for calibration at a given interval. A maximum interval can vary based on transmitter redundancy, time of service in the facility, and each plant's experience with calibration behavior of its transmitters. The maximum interval between calibrations can be a dynamic number meaning it can change (increase or decrease) as more history on calibration behavior of transmitters is accumulated and analyzed by each industrial facility.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A system of monitoring transmitters of an industrial facility, comprising:
   a calculation unit configured to calculate a maximum calibration interval value for a group of redundant transmitters by:
   (a) generating a probability of same-direction drift for all redundant transmitters;
   (b) inputting a total number of calibration adjustments made to each redundant transmitter over a period of time;
   (c) inputting a total number of calibration checks made to each redundant transmitter over the period of time;
   (d) generating a probability of calibration adjustment for each redundant transmitter by dividing the total number of calibration adjustments by the total number of calibration checks, respectively;
   (e) generating a probability that all redundant transmitters will require adjustment at the same time, based on the probabilities of calibration adjustment calculated for each redundant transmitter;
   (f) generating a probability of common mode drift by multiplying the calculated probability that all redundant transmitters in the group of redundant transmitters will require adjustment at the same time by the calculated probability of same direction drift for all redundant transmitters;
   (g) inputting a maximum probability of common-mode drift for the group of redundant transmitters;
   (h) calculating an average time interval between calibrations for each redundant transmitter;
   (i) calculating an average calibration interval by averaging the calculated average time interval between calibrations for each redundant transmitter;
   (j) calculating a maximum interval based on the calculated probability of common mode drift, the calculated average calibration interval, and the maximum probability of common-mode drift for the group of redundant transmitters; and
   (k) calculating the maximum calibration interval value from the calculated maximum interval, wherein the maximum calibration interval value is processed to be greater than or equal to the average calibration interval and is less than or equal to a maximum time span of plant calibration data; and
   a report generator configured to generate a report identifying transmitters from the group of redundant transmitters that are to be checked for calibration based on a calculated maximum calibration interval value to reduce unnecessary calibrations of the group of redundant transmitters.

2. The system of claim 1, wherein the total number of calibration adjustments is based on the total number of calibration adjustments required for each of the redundant transmitters over a period of time.

3. A method of deriving a maximum calibration interval value indicating an interval of time after which a calibration check should be made on at least one redundant transmitter in a group of redundant transmitters of an industrial facility, comprising:
   calculating probability that drift is occurring in a same direction for all redundant transmitters in the group of redundant transmitters, based on the number of redundant transmitters in the group of redundant transmitters;
   for each redundant transmitter, calculating a calibration adjustment value for said redundant transmitter;
   for each redundant transmitter, calculating a total number of calibration checks made to each redundant transmitter over the course of its service life to date;
   for each redundant transmitter, calculating a probability of calibration adjustment by dividing a total number of calibration adjustments made to each redundant transmitter by the total number of calibration checks;
   calculating a probability that all redundant transmitters in the group of redundant transmitters will require adjustment at the same time, based on the probabilities of calibration adjustment calculated for each redundant transmitter;
   calculating a probability of common mode drift by multiplying the calculated probability that all redundant transmitters in the group of redundant transmitters will require adjustment at the same time by the calculated probability that drift is occurring in a same direction for all redundant transmitters in the group of redundant transmitters;
   selecting a maximum probability of common-mode drift for the group of redundant transmitters;
   calculating an average time interval between calibrations for each redundant transmitter;
   calculating an average calibration interval by averaging the calculated average time interval between calibrations for each redundant transmitter;
   calculating a maximum interval based on the calculated probability of common mode drift, the calculated average calibration interval, and the maximum probability of common-mode drift for the group of redundant transmitters;
   calculating a maximum calibration interval value from said calculated maximum interval, wherein a calculated maximum calibration interval value is greater than or equal to the average calibration interval, and wherein the calculated maximum calibration interval value is less than or equal to a maximum time span of plant calibration data; and
   generating a report identifying transmitters from the group of redundant transmitters that are to be checked for calibration based on a calculated maximum calibration interval value to reduce unnecessary calibrations of the group of redundant transmitters.

4. The method of claim 3, further comprising generating a report including the calculated maximum calibration interval value for the group of redundant transmitters.

5. The method of claim 3, wherein the calibration adjustment value for a redundant transmitter is derived from a total number of calibration adjustments made to said redundant transmitter over the course of said redundant transmitter's service life to date.

6. The method of claim 3, wherein the industrial facility is a nuclear power plant.

7. The method of claim 3, wherein the industrial facility is a research reactor.

8. The method of claim 3, wherein the group of redundant transmitters include pressure sensors.

9. The method of claim 3, wherein the group of redundant transmitters include differential pressure sensors.

10. A method for monitoring transmitter drift within a group of redundant transmitters in an industrial facility, comprising:
    retrieving redundant output readings from said group of redundant transmitters;
    calculating an average of the retrieved output readings;

calculating a deviation value for each redundant transmitter based on a differential between the output reading for that redundant transmitter and the calculated average of the retrieved output readings;

identifying any transmitter with a deviation value in excess of a pre-determined value; and deriving a maximum calibration interval value indicating an interval of time after which a calibration check should be made on at least one redundant transmitter in the group of redundant transmitters, by:

calculating probability that drift is occurring in a same direction for all redundant transmitters in the group of redundant transmitters, based on the number of redundant transmitters in the group of redundant transmitters;

for each redundant transmitter, calculating a calibration adjustment value for said redundant transmitter;

for each redundant transmitter, calculating a total number of calibration checks made to said redundant transmitter over the course of its service life to date;

for each redundant transmitter, calculating a probability of calibration adjustment by dividing a total number of calibration adjustments made to each redundant transmitter by the total number of calibration checks;

calculating a probability that all redundant transmitters in the group of redundant transmitters will require adjustment at the same time, based on the probabilities of calibration adjustment calculated for each redundant transmitter;

calculating a probability of common mode drift by multiplying the calculated probability that all redundant transmitters in the group of redundant transmitters will require adjustment at the same time by the calculated probability that drift is occurring in a same direction for all redundant transmitters in the group of redundant transmitters;

selecting a maximum probability of common-mode drift for the group of redundant transmitters;

calculating an average time interval between calibrations for each redundant transmitter;

calculating an average calibration interval by averaging the calculated average time interval between calibrations for each redundant transmitter;

calculating a maximum interval based on the calculated probability of common mode drift, the calculated average calibration interval, and the maximum probability of common-mode drift for the group of redundant transmitters;

calculating the maximum calibration interval value from said calculated maximum interval, wherein the maximum calibration interval value is processed to be greater than or equal to the average calibration interval and less than or equal to a maximum time span of facility calibration data; and generating a report identifying transmitters from the group of redundant transmitters that are to be checked for calibration based on a calculated maximum calibration interval value to reduce unnecessary calibrations of the group of redundant transmitters.

11. The method of claim 10, wherein the calibration adjustment value for a redundant transmitter is derived from a total number of calibration adjustments made to said redundant transmitter over the course of said redundant transmitter's service life to date.

12. The method of claim 10, wherein the industrial facility is a nuclear power plant.

13. The method of claim 10, wherein the group of redundant transmitters include pressure sensors.

14. The method of claim 10, wherein the group of redundant transmitters include differential pressure sensors.

15. A method for monitoring transmitter drift within a group of redundant transmitters in an industrial facility, comprising:

retrieving redundant output readings from each redundant transmitter;

calculating an average of retrieved redundant output readings;

calculating a deviation value for each redundant transmitter based on a differential between the redundant output reading for a respective redundant transmitter and the calculated average of the retrieved redundant output readings;

identifying any transmitter with a deviation value in excess of a pre-determined value;

deriving a maximum calibration interval value indicating an interval of time after which a calibration check should be made on at least one redundant transmitter in the group of redundant transmitters, by:

calculating probability that drift is occurring in a same direction for all redundant transmitters in the group of redundant transmitters, based on a number of redundant transmitters in the group of redundant transmitters;

for each redundant transmitter, calculating a total number of calibration adjustments made to each redundant transmitter over the course of each respective redundant transmitter's service life to date;

for each redundant transmitter, calculating a total number of calibration checks made to each redundant transmitter over the course of its service life to date;

for each redundant transmitter, calculating a probability of calibration adjustment by dividing the total number of calibration adjustments by the total number of calibration checks;

calculating a probability that all redundant transmitters in the group of redundant transmitters will require adjustment at the same time, based on a calculated probability of calibration adjustment of each redundant transmitter;

calculating a probability of common mode drift by multiplying the calculated probability that all redundant transmitters in the group of redundant transmitters will require adjustment at the same time by the calculated probability that drift is occurring in a same direction for all redundant transmitters in the group of redundant transmitters;

selecting a maximum probability of common-mode drift for the group of redundant transmitters;

calculating an average time interval between calibrations for each redundant transmitter;

calculating an average calibration interval by averaging the calculated average time interval between calibrations for each redundant transmitter;

calculating a maximum interval based on the calculated probability of common mode drift, the calculated average calibration interval, and the maximum probability of common-mode drift for the group of redundant transmitters;

calculating a maximum calibration interval value from said calculated maximum interval, wherein a calculated maximum calibration interval value is greater than or equal to the average calibration interval, and wherein the calculated maximum calibration interval value is less than or equal to a maximum time span of plant calibration data; and supplying a calculated maximum calibration interval value to an online monitoring (OLM) system; and generating a report identifying transmitters from the group of redundant transmitters that are to be checked for calibration based on the calculated maximum calibration interval value to reduce unnecessary calibrations of the group of redundant transmitters.

* * * * *